(12) United States Patent
Van Eijndhoven et al.

(10) Patent No.: US 7,653,736 B2
(45) Date of Patent: Jan. 26, 2010

(54) DATA PROCESSING SYSTEM HAVING MULTIPLE PROCESSORS AND A COMMUNICATIONS MEANS IN A DATA PROCESSING SYSTEM

(75) Inventors: Josephus Theodorus Johannes Van Eijndhoven, Eindhoven (NL); Evert-Jan Daniël Pol, Eindhoven (NL); Martijn Johan Rutten, Eindhoven (NL); Pieter Van Der Wolf, Eindhoven (NL); Om Prakash Gangwal, Eindhoven (NL)

(73) Assignee: NXP B.V., Eindhoven (NL)

( * ) Notice: Subject to any disclaimer, the term of this patent is extended or adjusted under 35 U.S.C. 154(b) by 957 days.

(21) Appl. No.: 10/498,596

(22) PCT Filed: Dec. 5, 2002

(86) PCT No.: PCT/IB02/05168

§ 371 (c)(1),
(2), (4) Date: Jun. 9, 2004

(87) PCT Pub. No.: WO03/052586

PCT Pub. Date: Jun. 26, 2003

(65) Prior Publication Data

US 2005/0021807 A1 Jan. 27, 2005

(30) Foreign Application Priority Data

Dec. 14, 2001 (EP) .................................. 01204883

(51) Int. Cl.
 *G06F 15/16* (2006.01)
(52) U.S. Cl. ...................... 709/231; 709/230; 370/469; 370/473
(58) Field of Classification Search ................. 709/103, 709/200, 208, 230, 2, 120, 231; 370/469, 370/473; 719/323; 710/100; 345/558; 711/120; 718/106; 712/34; 348/571
See application file for complete search history.

(56) References Cited

U.S. PATENT DOCUMENTS

| 4,638,477 | A | * | 1/1987 | Okada et al. ................ 370/400 |
|---|---|---|---|---|
| 4,816,993 | A | * | 3/1989 | Takahashi et al. ............. 712/28 |
| 4,922,408 | A | * | 5/1990 | Davis et al. ................. 709/252 |
| 5,113,522 | A | * | 5/1992 | Dinwiddie et al. .......... 713/375 |
| 5,408,629 | A | * | 4/1995 | Tsuchiva et al. ............ 711/151 |
| 5,517,662 | A | * | 5/1996 | Coleman et al. ............ 709/201 |
| 5,568,614 | A | * | 10/1996 | Mendelson et al. ......... 709/231 |
| 5,790,881 | A | * | 8/1998 | Nguyen ....................... 712/34 |
| 5,959,689 | A | * | 9/1999 | De Lange et al. ........... 348/571 |
| 6,212,569 | B1 | * | 4/2001 | Cashman et al. ............ 709/236 |
| 6,304,891 | B1 | * | 10/2001 | Anderson et al. ........... 718/107 |
| 6,377,992 | B1 | * | 4/2002 | Plaza Fernandez et al. .. 709/227 |
| 6,484,224 | B1 | * | 11/2002 | Robins et al. ............... 710/305 |

(Continued)

OTHER PUBLICATIONS

Om Prakash Gangwal, Andre Nieuwland, Paull Lippens, "A Scalable and Flexible Data Synchronization Scheme for Embedded HW-SW Shared Memory Systems", 2001, ACM, pp. 1-6.*

*Primary Examiner*—Salad Abdullahi
*Assistant Examiner*—Anthony Mejia (57) ABSTRACT

Aspects involve effectively separating communication hardware in a data processing system by introducing a communication device for each processor. By introducing this separation the processors can concentrate on performing their function-specific tasks, while the communication device provide the communication support for the respective processor. Accordingly, in certain embodiments, a data processing system is provided with a computation, a communication support and a communication network layer.

31 Claims, 4 Drawing Sheets

U.S. PATENT DOCUMENTS

| | | | |
|---|---|---|---|
| 6,496,191 B2 * | 12/2002 | Asai et al. | 345/467 |
| 6,782,445 B1 * | 8/2004 | Olgiati et al. | 711/100 |
| 6,938,132 B1 * | 8/2005 | Joffe et al. | 711/156 |
| 6,993,023 B2 * | 1/2006 | Foster et al. | 370/389 |
| 7,099,328 B2 * | 8/2006 | Galbi et al. | 370/395.1 |
| 7,299,487 B1 * | 11/2007 | Campbell et al. | 725/93 |
| 7,515,610 B2 * | 4/2009 | Amagai et al. | 370/469 |
| 2002/0049822 A1 * | 4/2002 | Burkhardt et al. | 709/208 |
| 2002/0176416 A1 * | 11/2002 | Ben-Ze'ev et al. | 370/389 |
| 2003/0074389 A1 * | 4/2003 | Kang et al. | 709/106 |
| 2003/0236861 A1 * | 12/2003 | Johnson et al. | 709/219 |
| 2007/0021143 A1 * | 1/2007 | Jain et al. | 455/552.1 |
| 2008/0028103 A1 * | 1/2008 | Schlansker et al. | 709/250 |

* cited by examiner

FIG.1

FIG.2 a: Initial situation of 'data tape' with current access point:

b: Inquiry action/Getspace provides window on requested space:

c: Read/Write actions on contents:

d: Commit action/Putspace moves access point ahead:

DATA PROCESSING SYSTEM HAVING MULTIPLE PROCESSORS AND A COMMUNICATIONS MEANS IN A DATA PROCESSING SYSTEM

The invention relates to a data processing system having multiple processors, and a communication means in a data processing system having multiple processors.

A heterogeneous multiprocessor architecture for high performance, data-dependent media processing e.g. for high-definition MPEG decoding is known. Media processing applications can be specified as a set of concurrently executing tasks that exchange information solely by unidirectional streams of data. G. Kahn introduced a formal model of such applications already in 1974, 'The Semantics of a Simple Language for Parallel Programming', Proc. of the IFIP congress 74, August 5-10, Stockholm, Sweden, North-Holland publ. Co, 1974, pp. 471-475 followed by an operational description by Kahn and MacQueen in 1977, 'Co-routines and Networks of Parallel Programming', Information Processing 77, B. Gilchhirst (Ed.), North-Holland publ., 1977, pp 993-998. This formal model is now commonly referred to as a Kahn Process Network.

An application is known as a set of concurrently executable tasks. Information can only be exchanged between tasks by unidirectional streams of data. Tasks should communicate only deterministically by means of a read and write process regarding predefined data streams. The data streams are buffered on the basis of a FIFO behaviour. Due to the buffering two tasks communicating through a stream do not have to synchronise on individual read or write processes In stream processing, successive operations on a stream of data are performed by different processors. For example a first stream might consist of pixel values of an image, that are processed by a first processor to produce a second stream of blocks of DCT (Discrete Cosine Transformation) coefficients of 8×8 blocks of pixels. A second processor might process the blocks of DCT coefficients to produce a stream of blocks of selected and compressed coefficients for each block of DCT coefficients.

Figure 1:
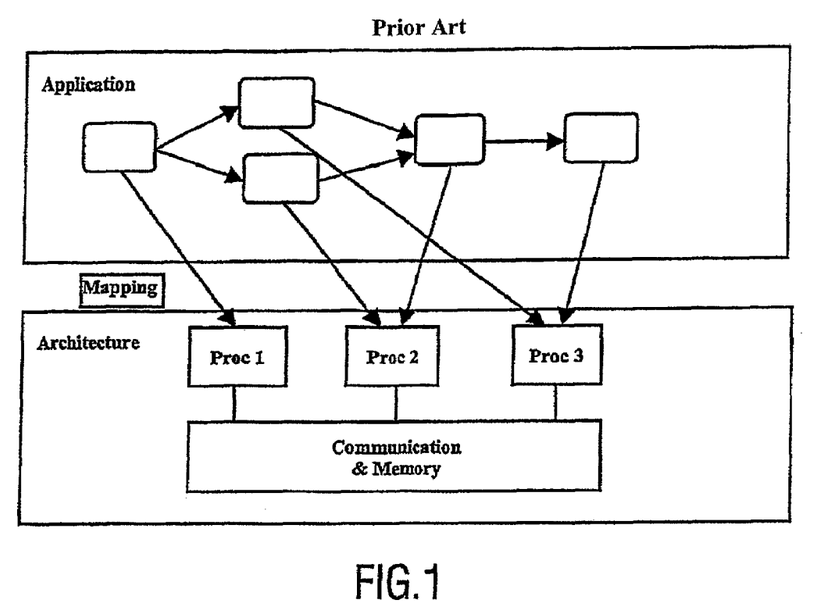
FIG. 1 an illustration of the mapping of an application to a processor according to the prior art.

FIG. 1 shows a illustration of the mapping of an application to a processor as known from the prior art. In order to realise data stream processing a number of processors are provided, each capable of performing a particular operation repeatedly, each time using data from a next data object from a stream of data objects and/or producing a next data object in such a stream. The streams pass from one processor to another, so that the stream produced by a first processor can be processed by a second processor and so on. One mechanism of passing data from a first to a second processor is by writing the data blocks produced by the first processor into the memory.

The data streams in the network are buffered. Each buffer is realised as a FIFO, with precisely one writer and one or more readers. Due to this buffering, the writer and readers do not need to mutually synchronize individual read and write actions on the channel. Reading from a channel with insufficient data available causes the reading task to stall. The processors can be dedicated hardware function units which are only weakly programmable. All processors run in parallel and execute their own thread of control. Together they execute a Kahn-style application, where each task is mapped to a single processor. The processors allow multi-tasking, i.e., multiple Kahn tasks can be mapped onto a single processor.

It is therefore an object of the invention to improve the operation of a Kahn-style data processing system.

This object is solved by a data processing system according to claim 1 as well as by a data processing method according to claim 24.

The invention is based on the idea to effectively separate communication hardware, e.g. busses and memory, and computation hardware, e.g. processors, in a data processing system by introducing a communication means for each processor. By introducing this separation the processors can concentrate on performing their function-specific tasks, while the communication means provide the communication support for the respective processor.

Therefore, a data processing system is provided with a computation, a communication support and a communication network layer. The computation layer comprises a first and at least a second processor for processing a stream of data objects. The first processor passes a number of data objects from a stream to the second processor which can then process the data objects. The communication network layer includes a memory and a communication network for linking the first processor and the second processors with said memory. The communication support layer is arranged between the computation layer and the communication network layer and comprises one communication means for each second processor in the computation layer. The communication means of each of the second processors controls the communication between the said second processor and the memory via the communication network in the communication network layer.

The introduction of the communication means between one of the second processors and the communication network layer provides a clearly defined system-level abstraction layer in particular by providing an abstraction of communication and memory implementation aspects. Furthermore, a distributed organisation with local responsibilities is realised whereby the scalability of the system is improved.

In a further embodiment of the invention said communication means comprises a reading/writing unit for enabling reading/writing of said associated second processor from/into said memory in the communication network layer, a synchronisation unit for synchronising the reading/writing of said associated second processor and/or inter-processor synchronization of memory access, and/or a task scheduling unit for scheduling tasks related to the attached processor, for administrating a set of tasks to be handled by said second processor, and/or administrating inter-task communication channels. Accordingly, by providing separate units the reading/writing, the synchronisation of the reading/writing and the task switching can be independently controlled by the communication means allowing a greater freedom in implementing different applications.

In still a further embodiment of the invention said communication unit is able to handle multiple inbound and outbound streams and/or multiple streams per task. This has the positive effect that a data stream produced by one task processed by a second processor can be forwarded to several other tasks for further processing and vice versa.

In another embodiment of the invention the communication means is capable of implementing the same functions for controlling the communication between said attached second processor and said memory independent of said attached processor. Therefore, the design of the communication means can be optimised primarily regarding its specific functions which are to be implemented by said communication means avoiding a strong influence of the design of the second processor.

In a further embodiment of the invention the communication between said second processors and their associated communication means is a master/slave communication with said second processor acting as master.

In a further embodiment of the invention said communication means in said communication support layer comprise an adaptable first task-level interface towards said associated second processor and a second system-level interface towards said communication network and said memory, wherein said first and second interfaces are active concurrently or non-concurrently. With the provision of a adaptable task-level interface facilitates the re-use of the communication means in the overall system architecture, while allowing the parameterisation and adoption for specific applications for a specific second processor.

In still a further embodiment of the invention at least one of said second processors is programmable, the first task-level interface of the communication means of said one of said second processors is at least partly programmable, and wherein part of the functionality of the communication means is programmable.

The invention also relates to a method for processing data in a data processing system comprising a first and at least a second processor for processing streams of data objects, said first processor being arranged to pass data objects from a stream of data objects to the second processor; at least one memory for storing and retrieving data objects; and one communication means for each of said second processors, wherein a shared access to said first and said second processors is provided, wherein the communication means of each of said second processors controlling the communication between said second processor and said memory.

The invention further relates to a communication means in a data processing system having a computation layer including a first and at least one second processor for processing a stream of data objects, said first processor being arranged to pass data objects from a stream of data objects to the second processor, a communication network layer including a communication network and a memory; and a communication support layer being arranged between said computation layer and said communication network layer. The communication means is adapted to be implemented operatively between the second processor and the communication network, is associated to second processors and controls the communication between said second processor and said memory via said communication network in the communication network layer.

Further embodiments of the invention are described in the dependent claims.

These and other aspects of the invention are described in more detail with reference to the drawings; the figures showing.

Figure 2:
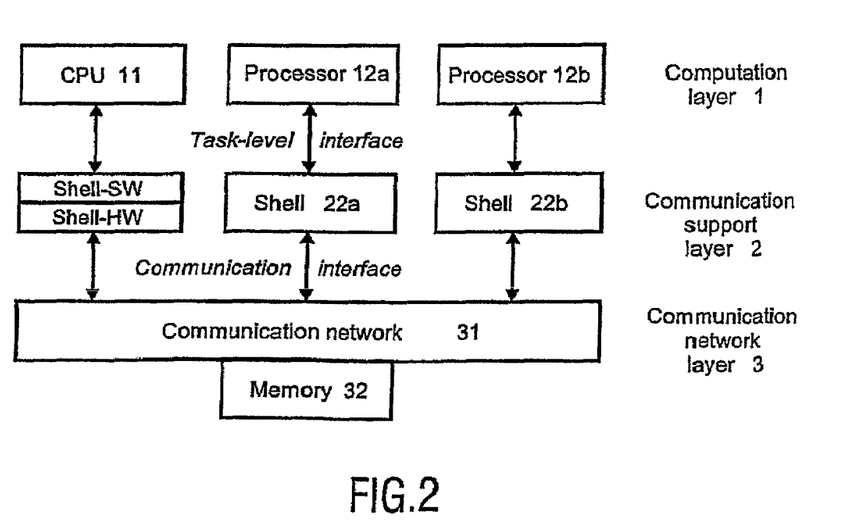
FIG. 2 a schematic block diagram of an architecture of a stream based processing system.

FIG. 2 shows a processing system for processing streams of data objects according to a preferred embodiment of the invention. The system can be divided into different layers, namely a computation layer 1, a communication support layer 2 and a communication network layer 3. The computation layer 1 includes a CPU 11, and two processors or processors 12a, 12b. This is merely by way of example, obviously more processors may be included into the system. The communication support layer 2 comprises a shell 21 associated to the CPU 11 and shells 22a, 22b associated to the processors 12a, 12b, respectively. The communication network layer 3 comprises a communication network 31 and a memory 32.

The processors 12a, 12b are preferably dedicated processor; each being specialised to perform a limited range of stream processing. Each processor is arranged to apply the same processing operation repeatedly to successive data objects of a stream. The processors 12a, 12b may each perform a different task or function, e.g. variable length decoding, run-length decoding, motion compensation, image scaling or performing a DCT transformation. In operation each processor 12a, 12b executes operations on one or more data streams. The operations may involve e.g. receiving a stream and generating another stream or receiving a stream without generating a new stream or generating a stream without receiving a stream or modifying a received stream. The processors 12a, 12b are able to process data streams generated by other processors 12b, 12a or by the CPU 11 or even streams that have generated themselves. A stream comprises a succession of data objects which are transferred from and to the processors 12a, 12b via said memory 32.

The shells 22a, 22b comprise a first interface towards the communication network layer being a communication layer. This layer is uniform or generic for all the shells. Furthermore the shells 22a, 22b comprise a second interface towards the processor 12a, 12b to which the shells 22a, 22b are associated to, respectively. The second interface is a task-level interface and is customised towards the associated processor 12a, 12b in order to be able to handle the specific needs of said processor 12a, 12b. Accordingly, the shells 22a, 22b have a processor-specific interface as the second interface but the overall architecture of the shells is generic and uniform for all processors in order to facilitate the re-use of the shells in the overall system architecture, while allowing the parameterisation and adoption for specific applications.

The shell 22a, 22b comprise a reading/writing unit for data transport, a synchronisation unit and a task switching unit. These three units communicate with the associated processor on a master/slave basis, wherein the processor acts as master. Accordingly, the respective three unit are initialised by a request from the processor. Preferably, the communication between the processor and the three units is implemented by a request-acknowledge handshake mechanism in order to hand over argument values and wait for the requested values to return. Therefore the communication is blocking, i.e. the respective thread of control waits for their completion.

The reading/writing unit preferably implements two different operations, namely the read-operation enabling the processors 12a, 12b to read data objects from the memory and the write-operation enabling the processor 12a, 12b to write data objects into the memory 32. Each task has a predefined set of ports which correspond to the attachment points for the data streams. The arguments for these operations are an ID of the respective port 'port_id', an offset 'offset' at which the reading/writing should take place, and the variable length of the data objects 'n_bytes'. The port is selected by a 'port_id' argument. This argument is a small non-negative number having a local scope for the current task only.

The synchronisation unit implements two operations for synchronisation to handle local blocking conditions on reading from an empty FIFO or writing to an full FIFO. The first operation, i.e. the getspace operation, is a request for space in the memory implemented as a FIFO and the second operation, i.e. a putspace operation, is a request to release space in the FIFO. The arguments of these operations are the 'port_id' and 'n-bytes' variable length.

The getspace operations and putspace operations are performed on a linear tape or FIFO order of the synchronisation, while inside the window acquired by the said the operations, random access read/write actions are supported.

The task switching unit implements the task switching of the processor as a gettask operation. The arguments for these operations are 'blocked', 'error', and 'task_info'.

The argument 'blocked' is a Boolean value which is set true if the last processing step could not be successfully completed because a getspace call on an input port or an output port has returned false. Accordingly, the task scheduling unit is quickly informed that this task should better not be rescheduled unless a new 'space' message arrives for the blocked port. This argument value is considered to be an advice only leading to an improved scheduling but will never affect the functionality. The argument 'error' is a Boolean value which is set true if during the last processing step a fatal error occurred inside the coprocessor. Examples from mpeg decode are for instance the appearance of unknown variable-length codes or illegal motion vectors. If so, the shell clears the task table enable flag to prevent further scheduling and an interrupt is sent to the main CPU to repair the system state. The current task will definitely not be scheduled until the CPU interacts through software.

The operations just described above are initiated by read calls, write calls, getspace calls, putspace calls or gettask calls from the processor.

Figure 3:
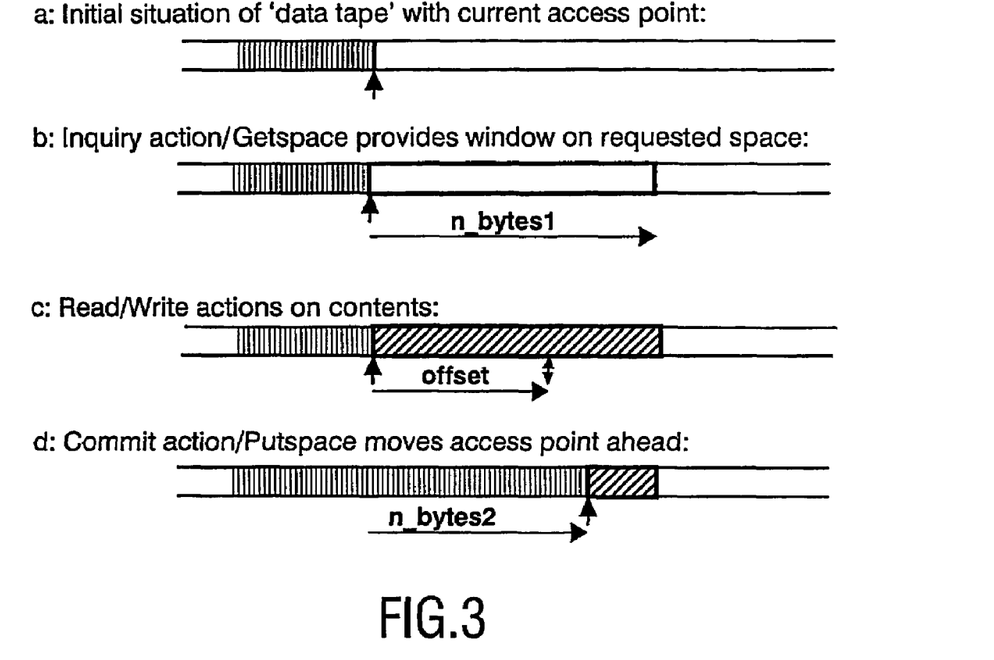
FIG. 3 an illustration of the synchronising operation and an I/O operation in the system of FIG. 2.

FIG. 3 depicts an illustration of the process of reading and writing and its associated synchronisation operations. From the processor point of view, a data stream looks like an infinite tape of data having a current point of access. The getspace call issued from the processor asks permission for access to a certain data space ahead of the current point of access as depicted by the small arrow in FIG. 3a. If this permission is granted, the processor can perform read and write actions inside the requested space, i.e. the framed window in FIG. 3b, using variable-length data as indicated by the n_bytes argument, and at random access positions as indicated by the offset argument.

If the permission is not granted, the call returns false. After one or more getspace calls—and optionally several read/write actions—the processor can decide if is finished with processing or some part of the data space and issue a putspace call. This call advances the point-of-access a certain number of bytes, i.e. n_bytes2 in FIG. 3d, ahead, wherein the size is constrained by the previously granted space.

Figure 4:
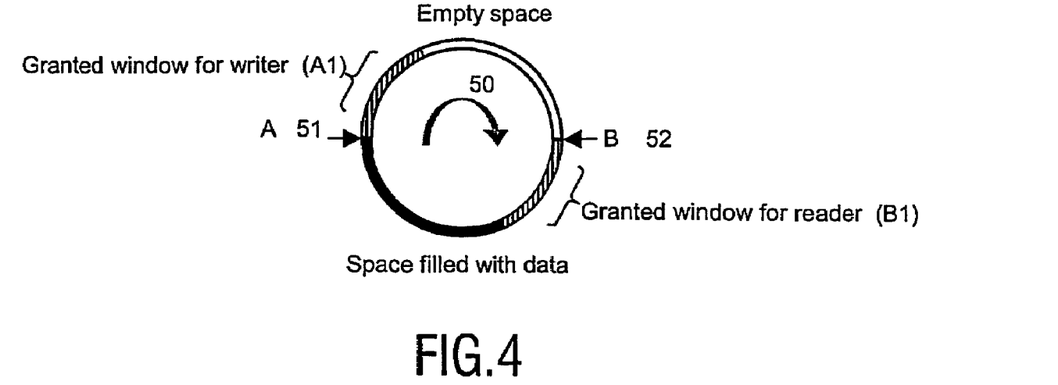
FIG. 4 an illustration of a cyclic FIFO memory.

FIG. 4 depicts an illustration of the cyclic FIFO memory. Communicating a stream of data requires a FIFO buffer, which preferably has a finite and constant size. Preferably, it is pre-allocated in memory, and a cyclic addressing mechanism is applied for proper FIFO behaviour in the linear memory address range.

A rotation arrow 50 in the centre of FIG. 4 depicts the direction on which getspace calls from the processor confirm the granted window for read/write, which is the same direction in which putspace calls move the access points ahead. The small arrows 51, 52 denote the current access points of tasks A and B. In this example A is a writer and hence leaves proper data behind, whereas B is a reader and leaves empty space (or meaningless rubbish) behind. The shaded region (A1, B1) ahead of each access point denote the access window acquired through getspace operation.

Tasks A and B may proceed at different speeds, and/or may not be serviced for some periods in time due to multitasking. The shells 22a, 22b provide the processors 12a, 12b on which A and B run with information to ensure that the access points of A and B maintain their respective ordering, or more strictly, that the granted access windows never overlap. It is the responsibility of the processors 12a, 12b to use the information provided by the shell 22a, 22b such that overall functional correctness is achieved. For example, the shell 22a, 22b may sometimes answer a getspace requests from the processor false, e.g. due to insufficient available space in the buffer. The processor should then refrain from accessing the buffer according to the denied request for access.

The shells 22a, 22b are distributed, such that each can be implemented close to the processor 12a, 12b that it is associated to Each shell locally contains the configuration data for the streams which are incident with tasks mapped on its processor, and locally implements all the control logic to properly handle this data. Accordingly, a local stream table is implemented in the shells 22a, 22b that contains a row of fields for each stream, or in other words, for each access point.

To handle the arrangement of FIG. 4, the stream table of the processor shells 22a, 22b of tasks A and B each contain one such line, holding a 'space' field containing a (maybe pessimistic) distance from its own point of access towards the other point of access in this buffer and an ID denoting the remote shell with the task and port of the other point-of-access in this buffer. Additionally said local stream table may contain a memory address corresponding to the current point of access and the coding for the buffer base address and the buffer size in order to support cited address increments.

These stream tables are preferably memory mapped in small memories, like register files, in each of said shells 22. Therefore, a getspace call can be immediately and locally answered by comparing the requested size with the available space locally stored. Upon a putspace call this local space field is decremented with the indicated amount and a putspace message is sent to the another shell which holds the previous point of access to increment its space value. Correspondingly, upon reception of such a put message from a remote source the shell 22 increments the local field. Since the transmission of messages between shells takes time, cases may occur where both space fields do not need to sum up to the entire buffer size but might momentarily contain the pessimistic value. However this does not violate synchronisation safety. It might even happen in exceptional circumstances that multiple messages are currently on their way to destination and that they are serviced out of order but even in that case the synchronisation remains correct.

Figure 5:
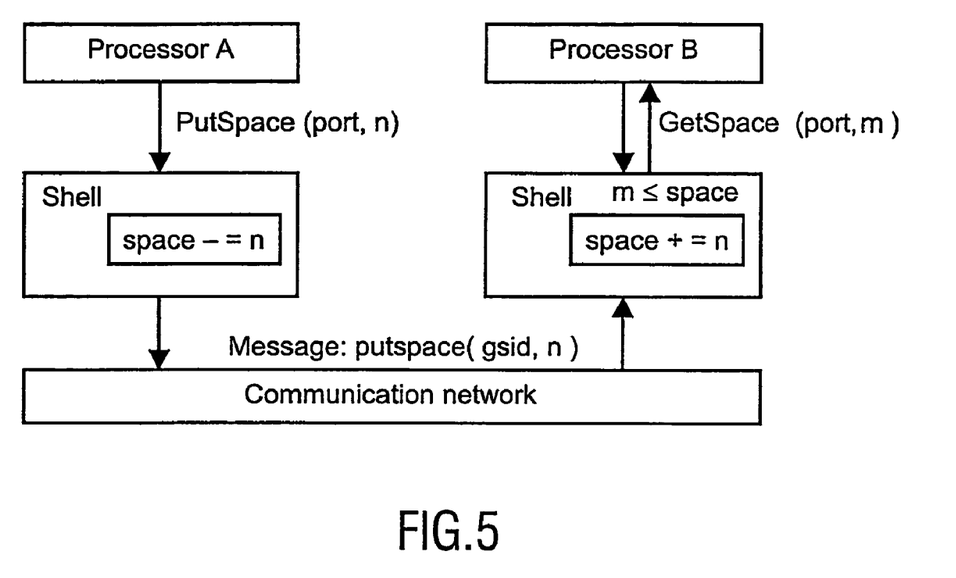
FIG. 5 a mechanism of updating local space values in each shell according to FIG. 2.

FIG. 5 shows a mechanism of updating local space values in each shell and sending 'putspace' messages. In this arrangement, a getspace request, i.e. the getsspace call, from the processor 12a, 12b can be answered immediately and locally in the associated shell 22a, 22b by comparing the requested size with the locally stored space information. Upon a putspace call, the local shell 22a, 22b decrements its space field with the indicated amount and sends a putspace message to the remote shell. The remote shell, i.e. the shell of another processor, holds the other point-of-access and increments the space value there. Correspondingly, the local shell increments its space field upon reception of such a putspace message from a remote source.

The space field belonging to point of access is modified by two sources: it is decrement upon local putspace calls and increments upon received putspace messages. It such an increment or decrement is not implemented as atomic operation, this could lead to erroneous results. In such a case separated local-space and remote-space field might be used, each of which is updated by the single source only. Upon a local getspace call these values are then subtracted. The shells 22 are always in control of updates of its own local table and performs these in an atomic way. Clearly this is a shell implementation issue only, which is not visible to its external functionality.

If getspace call returns false, the processor is free to decide an how to react. Possibilities are, a) the processor my issue a new getspace call with a smaller n_bytes argument, b) the processor might wait for a moment and then try again, or c) the processor might quit the current task and allow another task on this processor to proceed.

This allows the decision for task switching to depend upon the expected arrival time of more data and the amount of internally accumulated state with associated state saving cost. For non-programmable dedicated hardware processors, this decision is part of the architectural design process.

The implementation and operation of the shells 22 do not to make differentiations between read versus write ports, although particular instantiations may make these differentiations. The operations implemented by the shells 22 effectively hide implementation aspects such as the size of the FIFO buffer, its location in memory, any wrap-around mechanism on address for memory bound cyclic FIFO's, caching strategies, cache coherency, global I/O alignment restrictions, data bus width, memory alignment restrictions, communication network structure and memory organisation.

Preferably, the shell 22a, 22b operate on unformatted sequences of bytes. There is no need for any correlation between the synchronisation packet sizes used by the writer and a reader which communicate the stream of data. A semantic interpretation of the data contents is left to the processor. The task is not aware of the application graph incidence structure, like which other tasks it is communicating to and on which processors these tasks mapped, or which other tasks are mapped on the same processor.

In high-performance implementations of the shells 22 the read call, write call, getspace call, putspace calls can be issued in parallel via the read/write unit and the synchronisation unit of the shells 22a, 22b. Calls acting on the different ports of the shells 22 do not have any mutual ordering constraint, while calls acting on identical ports of the shells 22 must be ordered according to the caller task or processor. For such cases, the next call from the processor can be launched when the previous call has returned, in the software implementation by returning from the function call and in hardware implementation by providing an acknowledgement signal.

A zero value of the size argument, i.e. n_bytes, in the read call can be reserved for performing pre-fetching of data from the memory to the shells cache at the location indicated by the port_ID- and offset-argument. Such an operation can be used for automatic pre-fetching performed by the shell. Likewise, a zero value in the write call can be reserved for a cache flush request although automatic cache flushing is a shell responsibility.

Optionally, all five operations accept an additional last task_ID argument. This is normally the small positive number obtained as result value from an earlier gettask call. The zero value for this argument is reserved for calls which are not task specific but relate to processor control.

In the preferred embodiment the set-up for communication a data stream is a stream with one writer and one reader connected to the finite-size of FIFO buffer. Such a stream requires a FIFO buffer which has a finite and constant size. It will be pre-allocated in memory and in its linear address range is cyclic addressing mechanism is applied for proper FIFO behaviour.

Figure 6:
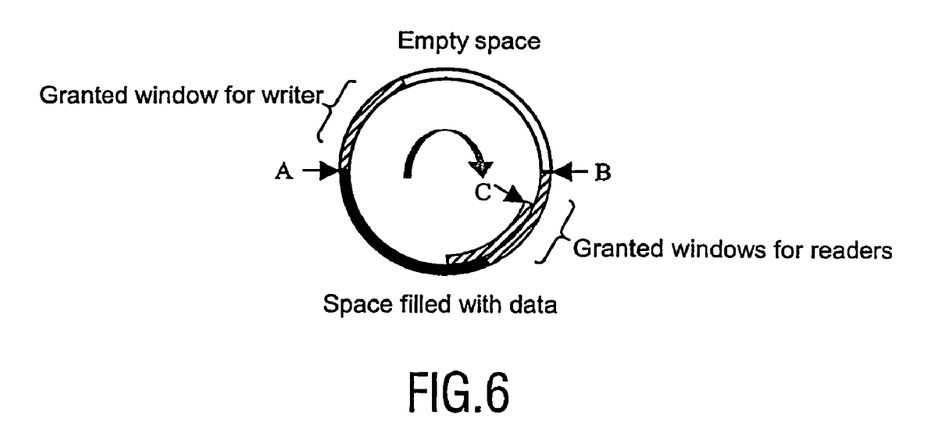
FIG. 6 an illustration of the FIFO buffer with a single writer and multiple readers.

However in a further embodiment based on FIG. 2 and FIG. 6, the data stream produced by one task is to be consumed by two or more different consumers having different input ports. Such a situation can be described by the term forking. However, we want to re-use the task implementations both for multi-tasking hardware processors as well as for software task running on the CPU. This is implemented through tasks having a fixed number of ports, corresponding to their basic functionality and that any needs for forking induced by application configuration are to be resolved by the shell.

Clearly stream forking can be implemented by the shells 22 by just maintaining two separate normal stream buffers, by doubling all write and putspace operations and by performing an AND-operation on the result values of doubled getspace checks. Preferably, this is not implemented as the costs would include a double write bandwidth and probably more buffer space. Instead preferably, the implementation is made, with two or more readers and one writer sharing the same FIFO buffer.

FIG. 6 shows an illustration of the FIFO buffer with a single writer and multiple readers. The synchronisation mechanism must ensure a normal pair wise ordering between A and B next to a pair wise ordering between A and C, while B and C have no mutual constraints, e.g. assuming they are pure readers. This is accomplished in the shell associated to the processor performing the writing operation by keeping track of available space separately for each reader (A to B and A to C). When the writer performs a local getspace call its n_bytes argument is compared with each of these space values. This is implemented by using extra lines in said stream table for forking connected by one extra field or column to indicate changing to a next line.

This provides a very little overhead for the majority of cases where forking is not used and at the same time does not limit forking to two-way only. Preferably, forking is only implemented by the writer and the readers are not aware of this situation.

Figure 7:
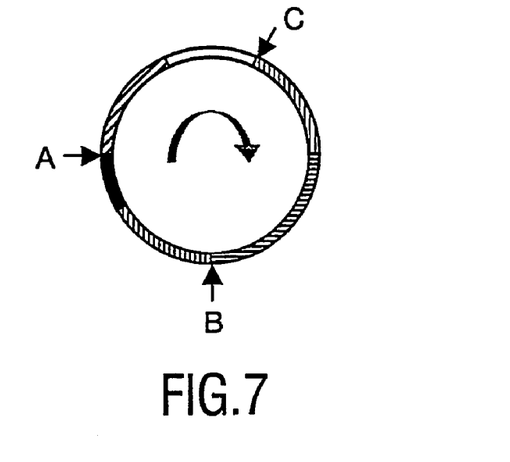
FIG. 7 a finite memory buffer implementation for a three-station stream.

In a further embodiment based on FIG. 2 and FIG. 7, the data stream is realised as a three station stream according to the tape-model. Each station performs some updates of the data stream which passers by. An example of the application of the three station stream is one writer, and intermediate watchdog and the final reader. In such example of the second task preferably watches the data that passes and may be inspects some while mostly allowing the data to pass without modification. Relatively infrequently it could decide to change a few items in the stream. This can be achieved efficiently by in-place buffer updates by a processor to avoid copying the entire stream contents from one buffer to another. In practice this might be useful when hardware processors 12 communicate and the maim CPU 11 intervenes to modify the stream to correct hardware flaws, to do adaptation towards slightly different stream formats, or just for debugging reasons. Such a set-up could be achieved with all three processors sharing the single stream buffer in memory, to reduce memory traffic and processor workload. The task B will not actually read or write the full data stream.

FIG. 7 depicts a finite memory buffer implementation for a three-station stream. The proper semantics of this three-way buffer include maintaining a strict ordering of A, B and C with respect to each other and ensuring no overlapping windows. In this way the three-way buffer is a extension from the two-way buffer shown in FIG. 4. Such a multi-way cyclic FIFO is directly supported by the operations of the shells as described above as well as by the distributed implementation style with putspace messages as discussed in the preferred embodiment. There is no limitation to just three stations in a single FIFO. In-place processing where one station both consumes and produces useful data is also applicable with only two stations. In this case both tasks performing in-place processing to exchange data with each other and no empty space is left in the buffer.

In the further embodiment based on FIG. 2 the single access to buffer is described. Such a single access buffer comprises only a single port. In this example no data exchange between tasks or processors will be performed. Instead, it is merely an application of the standard communication operations of said shells for local use. The set-up of the shells consists of the standard buffer memory having a single access point attached to it. The task can now use the buffer as a local scratchpad or cache. From the architectural point of view this can have advantages such as the combined uses of larger memory for several purposes and tasks and for example the use of the software configurable memory size. Besides the use as scratchpad memory to serve the task specific algorithm of this set-up is well applicable for storing and retrieving tasks states in the multi-tasking processor. In this case performing read/write operations for state swapping is not part of the task functional code itself but part of the processor control code. As the buffer is not used to communicate with other tasks it is normally no need to perform the put space and getspace operations on this buffer.

Figure 8:
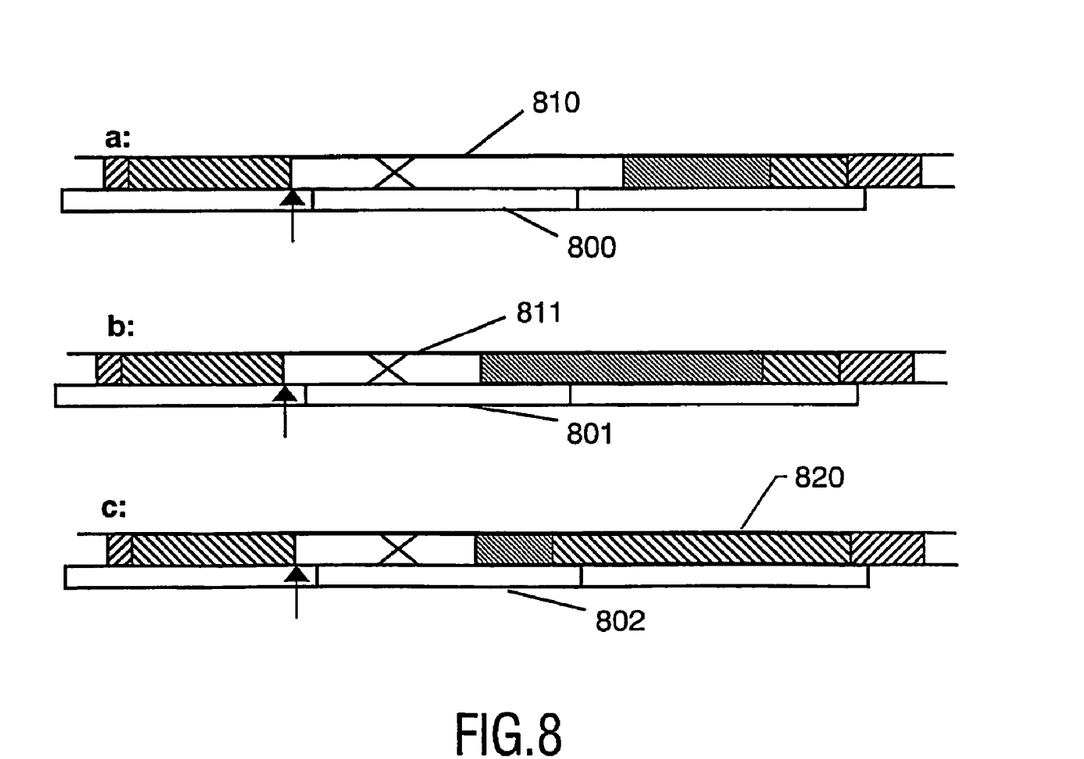
FIG. 8 an illustration of reading and administrating the validity of data in a cache.

In a further embodiment based on FIG. 2 and FIG. 8, the shells 22 according to the preferred embodiment further comprise a data cache for data transport, i.e. read operation and write operations, between the processors 12 and the communication network 31 and the memory 32. The implementation of a data cache in the shells 22 provide a transparent translation of data bus widths, a resolvement of alignment restrictions on the global interconnect, i.e. the communication network 31, and a reduction of the number of I/O operations on the global interconnect.

Preferably, the shells 22 comprise the cache in the read and write interfaces, however this these caches are invisible from the application functionality point of view. Here, the mechanism to use of the putspace and getspace operations is used to explicitly control cache coherence. The caches a play an important role in the decoupling the processor read and write ports from the global interconnect of the communication network 3. These caches have the major influence on the system performance regarding speed, power and area.

The access the window on stream data which is granted to a task port is guaranteed to be private. As a result read and write operations in this area are save and at first side do not need intermediate intra-processor communication. The access window is extended by means of local getspace request obtaining new memory space from a predecessor in the cyclic FIFO. If some part of the cache is tagged to correspond to such an extension and the task may be interested in reading the data in that extension than such part of the cache needs invalidation. It then later a read operation occurs on this location a cache miss occurs and fresh valid data is loaded into the cache. A elaborate shell implementation could use the get space to issue the pre-fetch request to reduce cache miss penalty. The access window is shrunk by means of local putspace request leaving new memory space to a successor in the cyclic FIFO. If some part of such a shrink happens to be in the cache and that part has been written, i.e. is dirty or unusable, than such part of the cache needs to be flushed to make the local data available to other processors. Sending the putspace message out to another processor must be postponed until the cache flush is completed and safe ordering of memory operations can be guaranteed.

Using only local getspace and putspace events for explicit cache coherency control is relatively easy to implement in a large system architectures in comparison with other generic cache coherency mechanisms such as a bus snooping. Also it does not provide the communication overhead like for instance a cache write-through architecture.

The getspace and putspace operations are defined to operate at byte granularity. A major responsibility of the cache is to hide the global interconnect data transfer size and the data transfer alignment restrictions for the processor. Preferably, the data transfer size is set to 16 bytes on ditto alignment, whereas synchronised data quantities as small as 2 bytes may be actively used. Therefore, the same memory word or transferred unit can be stored simultaneously in the caches of different processors and invalidate information is handled in each cache at byte granularity.

FIG. 8 shows the reading and administrating of the validity of data in a cache in three different situations. In this figure each of the situations assumes that the read request occurs on an empty cache resulting in a cache miss. FIG. 8*a* indicates the read request that leads to fetching a memory transfer unit 800, i.e. a word, which is entirely contained inside the granted window 810. Clearly this whole word is valid in memory and no specific (in-)validation measurements are required.

In the FIG. 8*b* the fetched word 801 partially extends beyond the space 811 acquired by the processor but remains inside the space that is locally administrated in the shell as available. If only the getspace argument would be used this word would become partially declared invalid and it would need to be re-read once the getspace window is extended. However, if the actual value of available space is checked the entire word can be marked as valid.

In FIG. 8*c* the fetched word 802 partially extends into space 820 which is not known to be saved and might still become written by some other processor. Now it is mandatory to mark this area in the word as invalid when it is loaded into the cache. If this part of the word gets accessed later the word needs to be re-read since the unknown part could in general also extend in this word at the left of the current point of access.

Furthermore a single read request could cover more than one memory word either because it crosses the boundary between two successive word or because the read interface of the processor is wider than the memory word. FIG. 8 shows memory words which are relatively large in comparison with the requested buffer space. In practice the requested windows would often be much larger, however in an extreme case the entire cyclic communication buffer could also be as small as a single memory word.

In cache coherency control there are tight relations between the getspace, the read operation and (in-)invalid marks, as well as between putspace, write operations and dirty marks and cache flushes. In a 'Kahn'-style application of ports have had dedicated direction either input or output. Preferably, the separated read and write caches are used which simplifies some implementation issues. As for many streams the processors will linearly work through cyclic address space, the read caches optionally support pre-fetching and the write caches optionally support the pre-flushing, within two read access moves to the next word the cache location of the previous word can be made available for expected future use. Separate implementations of the read and write data path also more easily supports read and write requests from the processor occurring in parallel for instance in a pipelined processor implementation.

Also the processors write data at byte granularity and cache administrates dirty bits per bite in the cache. Upon the putspace request of the cache flushes those words from the cache to their shared memory which overlap with the address range indicated by this request. The dirty bits are to be used for the write mask in the bus write requests to assure that the memory is never written at byte positions outside the access window.

In another embodiment based on FIG. 2, the synchronisation units in the shell 22a are connected to other synchronisation units in another shell 22b. The synchronization units ensures that one processor does not access memory locations before valid data for a processed stream has been written to these memory locations. Similarly, synchronization interface is used to ensure that the processor 12a does not overwrite useful data in memory 32. Synchronization units communicate via a synchronization message network. Preferably, they form part of a ring, in which synchronization signals are passed from one processor to the next, or blocked and overwritten when these signals are not needed at any subsequent processor. The synchronization units together form a synchronization channel. The synchronization unit maintain information about the memory space which is used for transferring the stream of data objects from processor 12a to processor 12b.

The invention claimed is:

1. A data processing system that processes data in layers of a layered communication protocol where data is passed by progressing through the layers sequentially, the system comprising:
 a computation layer including a first general-purpose processor and at least one second processor for processing a stream of data objects according to a task-specific configuration implemented in the second processor, said first processor being arranged to pass data objects from a stream of data objects to the second processor via the layered communication protocol;
 a communication network layer including a communication network and a memory; and
 a communication support layer including one communication unit for each of said second processors, said communication support layer being arranged between said computation layer and said communication network layer;
wherein the communication unit of each of said second processors controls the communication between said second processor and said memory via said communication network in the communication network layer.

2. Data processing system according to claim 1, wherein said second processor is a multi-tasking processor, capable of interleaved processing of a first and second task, said first and second tasks process a first and second stream of data objects, respectively.

3. Data processing system according to claim 2, wherein said communication units are arranged to handle multiple inbound and outbound streams and multiple streams per task.

4. Data processing system according to claim 1, wherein each of said communication units comprises: a reading/writing unit for enabling reading/writing of said associated second processor from/into said memory in the communication network layer, a synchronization unit for synchronizing the reading/writing of said associated second processor and/or inter-processor synchronization of memory access, and/or a task scheduling unit for scheduling tasks related to the attached processor, for administrating a set of tasks to be handled by said second processor, and/or administrating inter-task communication channels.

5. Data processing system according to claim 1, wherein the communication unit is adopted to control the communication between said second processor and said memory independent of said processor.

6. Data processing system according to claim 1, wherein said communication unit provides functionality for mapping transported data into memory ranges.

7. Data processing system according to claim 1, wherein the communication between said second processors and their associated communication unit is a master/slave communication, said second processors acting as masters.

8. Data processing system according to claim 1, wherein said second processors being function-specific dedicated processors for performing a range of stream processing tasks.

9. Data processing system according claim 1, wherein said communication unit in said communication support layer comprise an adaptable first task-level interface towards said associated second processor in said computation layer and a second system-level interface towards said communication network and said memory, wherein said first and second interfaces are active concurrently or non-concurrently.

10. Data processing system according claim 1, wherein at least one of said second processors is programmable, the first task-level interface of the communication unit of said one of said second processors is at least partly programmable, and wherein part of the functionality of the communication unit is programmable.

11. Data processing system according to claim 1, wherein said communication units comprise additional interfaces for exchanging control information and/or synchronization information directly with other communication units in said data processing system.

12. Data processing system according to claim 11, wherein said communication units are connected via their additional interfaces in a token ring arrangement.

13. Data processing system according to claim 1, wherein each said communication unit is adopted to handle multi-casting of an output stream to more than one receiving second processor without notifying the sending second processor thereof.

14. Data processing system according to claim 1, wherein each said communication unit is adopted to hide implementation aspects of the communication network to the associated second processor.

15. A communication unit in a data processing system that processes data in layers of a layered communication protocol where data is passed by progressing through the layers sequentially, comprising:
 a computation layer including a first general-purpose processor and at least one second processor for processing a stream of data objects according to a task-specific configuration implemented in the second processor, said first general-purpose processor being arranged to pass data objects from a stream of data objects to the second processor via the layered communication protocol,
 a communication network layer including a communication network and a memory; and
 a communication support layer being arranged between said computation layer and said communication network layer;
wherein the communication unit is associated to the second processors and controls the communication between said second processor and said memory via said communication network in the communication network layer.

16. A communication unit according to claim 15, wherein said communication unit is arranged to handle multiple inbound and outbound streams and/or multiple streams per task.

17. A communication unit according to claim 15, further comprising a reading/writing unit for enabling reading/writing of said associated second processor from/into said memory in the communication network layer, a synchronization unit for synchronizing the reading/writing of said associated second processor and/or inter-processor synchronization of memory access, and/or a task scheduling unit for scheduling tasks related to the attached processor, for administrating a set of tasks to be handled by said second processor, and/or administrating inter-task communication channels.

18. A communication unit according to claim 15, wherein the communication between the communication unit and the second processor is a master/slave communication, wherein said second processors acting as masters.

19. A communication unit according claim 15, further comprising an adaptable first task-level interface towards said associated second processor in said computation layer and a second system-level interface towards said communication network and said memory, wherein said first and second interfaces are active concurrently or non-concurrently.

20. A communication unit according claim 15, wherein the first task-level interface is at least partly programmable, and wherein part of the functionality of the communication unit is programmable.

21. A communication unit according claim 15, further comprising additional interfaces for exchanging control information and/or synchronization information directly with other communication units in said data processing system.

22. A communication unit according claim 15, wherein said communication unit is adopted to handle multi-casting of an output stream to more than one receiving second processor without notifying the sending second processor thereof.

23. A communication unit according claim 15, wherein said communication unit is adopted to hide implementation aspects of the communication network to the associated second processor.

24. Method for processing data in a data processing system that processes data in layers of a layered communication protocol where data is passed by progressing through the layers sequentially, the system having:
a computation layer including a first general-purpose processor and at least a second processor for processing a stream of data objects according to a task-specific configuration implemented in the second processor, said first processor being arranged to pass data objects from a stream of data objects to the second processor via the layered communication protocol;
a communication network layer including a communication network and at least one memory for storing and retrieving data objects; and
a communication support layer including one communication unit for each of said second processors, said communication support layer being arranged between said computation layer and said communication layer, wherein a shared access to said first general-purpose processor and said second processors is provided, said method comprising the steps of:
the communication unit of each of said second processors controlling the communication between said second processor and said memory via said communication network in the communication network layer.

25. Method for processing data according to claim 24, further comprising the step of said communication unit handling multiple inbound and outbound streams and/or multiple streams per task.

26. Method for processing data according to claim 24, wherein said controlling step comprises the steps of:
enabling reading/writing of said associated second processor from/into said memory in the communication network layer,
synchronizing the reading/writing of said associated second processor and/or inter-processor synchronization of memory access, and/or scheduling tasks related to the attached processor,
administrating a set of tasks to be handled by said second processor, and/or administrating inter-task communication channels, wherein said controlling step is carried out on an interconnected circuit arrangement, with the respective layers being processing layers within the circuit arrangement.

27. Method for processing data according to claim 24, wherein the communication between said second processors and their associated communication units is a master/slave communication, said second processors acting as masters.

28. Method for processing data according claim 24, wherein said communication unit handling multi-casting of an output stream to more than one receiving second processor without notifying the sending second processor thereof.

29. Method for processing data according claim 24, wherein said communication unit hiding implementation aspects of the communication network to the associated second processor.

30. The data processing system of claim 1, wherein the data processing system is implemented on a common circuit arrangement for processing video data and generating an output video stream.

31. The communication unit of claim 15, wherein each layer is implemented on a common circuit arrangement for processing video data and generating an output video stream.

* * * * *